United States Patent Office 2,808,425
Patented Oct. 1, 1957

2,808,425

SUBSTITUTION PRODUCTS OF POLYFLUORO-OLEFINS AND PROCESSES FOR THE PREPARATION THEREOF

Robert Neville Haszeldine, Cambridge, England

No Drawing. Application August 31, 1953,
Serial No. 377,711

Claims priority, application Great Britain
September 3, 1952

24 Claims. (Cl. 260—464)

This invention relates to certain new and useful substitution products of polyfluoroolefins and processes of making such products.

It has been noted that a polyfluorohydrocarbon group may have a marked effect on the chemical properties of adjacent organic functional groups. The present invention is concerned with unsaturated compounds having a polyfluorohydrocarbon group adjacent to an unsaturated carbon atom and with reactions involving such compounds.

In accordance with one aspect of my invention, there is provided a new class of compounds represented by the general formula $R_FCH=CHX$ in which $R_F$ is a polyfluorohydrocarbon group having at least two fluorine atoms on the carbon atom nearest the olefinic bond, and X represents fluorine, cyano, carboxyl or a primary or secondary amine radical.

In preparing a compound of the class defined above, a polyfluorohydrocarbon-substituted acetylene $R_FC\equiv CH$ is reacted with a compound HX' as follows:

$$R_FC\equiv CH + HX' \rightarrow R_FCH=CHX'$$

where X' is flourine, cyano, or a primary or secondary amine radical. The marked effect of the polyfluorohydrocarbon group may be noted in the above reaction in that the addition takes place in the opposite sense, with reference to the direction of the H and the X' respectively, to the addition that takes place in the case of an acetylene not containing a polyfluorohydrocarbon group near the acetylenic bond. Furthermore, when X' is a primary or secondary amine radical, the addition takes place more readily than with the corresponding non-fluorinated acetylenic hydrocarbon. As explained in more detail below, compounds in which X is a carboxyl group may be obtained by hydrolysis of the corresponding cyano compound.

The addition may be brought about simply by bringing the reactants together at room temperature or slightly elevated temperatures under pressure, especially in the case of HF addition, or may be catalyzed by boron trifluoride (for HF addition), or by copper salts such as cuprous chloride (in the case of HCN or amine addition).

In the case of the $R_FC\equiv CH$ starting compound, it is preferred that $R_F$ should be a perfluorohydrocarbon group namely a perfluoroalkyl, perfluorocloalkyl or perfluoroaromatic group, and of these latter groups those particularly preferred are perfluoroalkyl having not more than 20 carbon atoms, perfluorocycloalkyl having not more than 6 carbon atoms in the ring, perfluorophenyl and its analogues and homologues. Examples of the $R_FC\equiv CH$ starting compounds include perfluoromethyl-, perfluoroethyl-, perfluoropropyl-, perfluoroisopropyl-, the various perfluorobutyl-, the various perfluoroamyl-, the various perfluorohexyl-, perfluorocyclohexyl-, and perfluorophenyl-substituted acetylenes, as well as perfluoro homologues of these compounds.

In the case of the HX' starting compounds, where X' represents a primary or secondary amine radical, there may be present in the amine radical substituents other than hydrocarbon and halogenohydrocarbon but there should not be an excessive number of such substituents. In practice, it is preferred that the starting compound HX' should be such that X' represents $R_1R_2N$ where $R_1$ and $R_2$ are alkyl having not in excess of about 20 carbon atoms, halogenoalkyl having not in excess of about 20 carbon atoms, cycloalkyl having not in excess of about 6 carbon atoms in the ring, halogenocycloalkyl having not in excess of about 6 carbon atoms in the ring, phenyl, halogenophenyl, or the analogues and homologues of the last two groups; $R_1$ and $R_2$ may of course be different and one of them may be hydrogen. Examples of the HX' amine type starting compounds which may be employed include methylamine, dimethylamine, ethylamine, diethylamine, and the analogous propyl-, butyl-, amyl-, hexyl-, etc. -amines, mono or di; mixed dialkylamines such as methylethylamine; amines where one or both R groups in the formula $HR_1R_2N$ are cyclohexyl or other cycloalkyl groups; amines where one or both R groups are phenyl-, benzyl-, tolyl-, xylyl-, or other aryl, alkaryl or aralkyl groups; the various mixed disubstituted amines, i. e. amines in which the two R groups are from different classes of hydrocarbon groups; and the amines as listed above but containing halogen substituents.

The new compounds represented by the type formula $R_FCH=CHX$ given above are useful for various purposes, particularly as intermediates in the preparation of other highly fluorinated chemicals since in every case these compounds contain a reactive olefinic bond and in the cases where X is CN the compounds serve as source material for highly fluorinated carboxylic acids and various derivatives of these. Examples of new compounds of my invention within the above-defined class include $CF_3CH=CHF$, $C_2F_5CH=CHF$, $C_3F_7CH=CHF$,
$C_4F_9CH=CHF$, $C_5F_{11}CH=CHF$, $C_6F_{13}CH=CHF$,

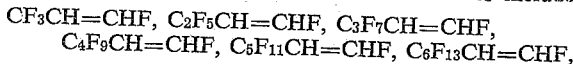

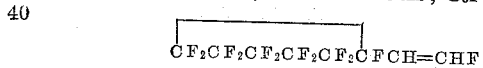

$C_6F_5CH=CHF$, the corresponding cyano compounds, i. e. each of the above compounds with the final —F replaced by —CN, the corresponding methylamino and dimethylamino compounds, i. e., each of the above compounds with the final —F replaced with —$NHCH_3$ or —$N(CH_3)_2$, and the corresponding amino compounds that are produced by employing each of the other amines enumerated in the preceding paragraph. A particularly useful class of compounds within my invention are those represented by the formula $C_nF_{2n+1}CH=CHX$ in which $n$ is an integer not greater than 20, X represents F, CN, or $NR_1R_2$, each R representing hydrogen or an alkyl group of not more than about 20 carbon atoms, the two R's being either the same or different except that only one may be hydrogen.

Another aspect of my invention involves the further reaction of certain of the above compounds, namely, those represented by the type formula $R_FCH=CHCN$ to form other useful products. Thus, these nitriles may be hydrolyzed, for example, by heating in dilute aqueous sodium hydroxide solution, to form the corresponding carboxylic acids which are also new compounds represented by the type formula $R_FCH=CHCOOH$. An example of such an acid is the $\gamma,\gamma,\gamma$-trifluorocrotonic acid, which is an acid appreciably stronger than either the corresponding $\gamma,\gamma,\gamma$-trifluorobutyric acid, or the corresponding unsubstituted crotonic acid. Other examples of these acids are those derived from the various cyano compounds specified in the preceding paragraph.

These new carboxylic acids of my invention may also be conveniently prepared by another route involving the two following reactions:

$$R_FI + CH_2=CHCN \rightarrow R_FCH_2CHICN$$

$$R_FCH_2CHICN \xrightarrow[\text{and hydrolysis}]{\text{dehydroiodination}} R_FCH=CHCOOH$$

The first of the above reactions may, for example, be carried out by subjecting the reactants under moderate pressure to ultraviolet light. The dehydroiodination and hydrolysis involved in the second reaction is readily accomplished by means of alcoholic potash. The intermediate polyfluoroiodonitriles represented in the above two reactions are a new class of chemical compounds, one example thereof being γ,γ,γ-trifluoro-α-iodobutyronitrile.

The salts of the above-noted carboxylic acids of my invention are also new compounds of considerable interest. Thus, the sodium salts of the above-noted acids may be decarboxylated, in accordance with a process which represents another aspect of my invention (for example, by heating with ethylene glycol in the presence of boric acid), to form the corresponding olefins of one less carbon atom in accordance with a reaction which may be represented as follows:

$$R_FCH=CHCOONa \xrightarrow[\text{decarboxylation}]{} R_FCH=CH_2$$

In general the decarboxylation reactions above referred to are carried out in the presence of a solvent from which hydrogen can be abstracted.

The silver salt may also be simultaneously decarboxylated and iodinated, in a process that represents another aspect of my invention, to give the iodoolefin of one less carbon atom following a reaction which may be represented as follows:

$$R_FCH=CHCOOAg \xrightarrow{I_2} R_FCH=CHI(+CO_2+AgI)$$

The following examples, in which all parts are by weight, serve to illustrate the various aspects of my invention.

*Example 1*

Into a cooled nickel bomb was distilled anhydrous hydrogen fluoride (10 parts) and trifluoromethylacetylene (0.94 part). The bomb was sealed, warmed to room temperature, and allowed to stand for 48 hours, the temperature then being raised to 60° C. for 4 hours. After cooling, the reaction products were distilled into water and the residual volatile material condensed, re-washed with water and transferred to a vacuum system. Fractionation gave 1,3,3,3-tetrafluoropropene, 92%. (Found: C, 31.8; H, 2.2; M, 114. $C_3H_2F_4$ requires C, 31.6; H, 1.75%; M, 114.) B. P.—16° C.

*Example 2*

Trifluoromethylacetylene (0.94 part) was sealed in a pressure vessel with anhydrous hydrogen cyanide (0.81 part), potassium cyanide (0.1 part), potassium chloride (0.2 part), cuprous chloride (0.8 part), and water (10 parts), and heated to 110° C. for 24 hours. Unchanged trifluoromethylacetylene (48%) was recovered. A similar experiment carried out at 120° C. for 36 hours gave 36% recovered trifluoromethylacetylene. The combined liquid phase material was filtered through glass wool. This liquid phase material contained γ,γ,γ-trifluorocrotonitrile in a yield in excess of 60% based on trifluoromethylacetylene consumed.

*Example 3*

Trifluoromethylacetylene (0.94 part) was sealed with cuprous chloride (0.02 part) and diethylamine (3 parts) and after standing at room temperature for 4 hours was slowly heated at 100° C. Unchanged trifluoromethylacetylene (0.11 part) was recovered, and after pouring into water (fluoride present) distillation of the lower layer in vacuo gave 1-diethylamino-3,3,3-trifluoropropene (28%). (Found: N, 8.3; M, 161. $C_7H_{12}NF_3$ requires N, 8.4%; M, 167.) B. P. ca. 40° C./105 mm.

*Example 4*

The liquid phase material from Example 2 was treated with an excess of 10% sodium hydroxide solution and slowly heated under reflux to 80° C. After filtration the solution was acidified (sulfuric acid) and continuously extracted by ether for 24 hours. After drying (sodium sulfate), the ether was removed and the residual solid was fractionally recrystallized from petroleum ether to give γ,γ,γ-trifluorocrotonic acid. (Found: C, 34.1; H, 2.3; equivalent 140. $C_4H_2O_2F_3$ requires C, 34.3; H, 2.1; equivalent 140.) M. P. 51° C.

*Example 5*

Acrylonitrile (0.53 part) was sealed with excess of trifluoroiodomethane (8.5 parts) in a pressure vessel which was then irradiated by ultraviolet light for 48 hours. The excess trifluoroiodomethane was removed and unchanged acrylonitrile (ca. 0.01 part) was distilled from the residual liquid in vacuo. The γ,γ,γ-trifluoro-α-iodobutyronitrile was separated from a trace of polyacrylonitrile by distillation in vacuo, and treated immediately with a 5% excess of 10% alcoholic potassium hydroxide initially at room temperature and finally at 50° C. for one hour. After acidification with excess dilute sulfuric acid, ether extraction followed by crystallization from petroleum ether gave γ,γ,γ-trifluorocrotonic acid (1.02 parts; 72%), M. P. 50.5–51° C.

*Example 6*

The trifluorocrotonic acid of Example 5 was converted to its sodium salt (0.40 part), which was then placed in a distillation vessel containing ethylene glycol (15 parts) and boric acid (2 parts), and fitted with reflux condenser leading to traps cooled by liquid air. The temperature was raised from 150 to 200° C. over 4 hours and by controlled pumping a vigorous reflux was maintained and the volatile products of reaction were removed from the reaction vessel. These were then passed through 15% sodium hydroxide, and the residual gas, dried by distillation in vacuo, was found to be 3,3,3-trifluoropropene (0.99 part; 41%).

*Example 7*

The silver salt (1.23 parts), prepared from the trifluorocrotonic acid of Example 5 by treatment with silver oxide or carbonate was dried in vacuo and mixed with dry powdered iodine (3 parts). The mixture was then rapidly heated in a silica trap at a pressure ca. 10 mm., so that the reaction products collected in an adjacent trap cooled in liquid air. After removal of the carbon dioxide by allowing the trap to warm to room temperature, the excess iodine was removed by treatment with thiosulfate and the liquid distilled to give only 3,3,3-trifluoro-1-iodopropene (0.83 part; 76%). The absence of isomers was shown by examination of the infra-red spectrum.

In addition to the uses specified above, certain of the novel compounds of the invention are useful as surfactants.

Also, it should be pointed out that the expression polyfluorohydrocarbon group used herein does not exclude hydrocarbon groups in which halogen substituents other than fluorine are present.

It will be obvious to those skilled in the art that many modifications may be made within the scope of the present invention without departing from the spirit thereof, and the invention includes all such modifications.

I claim:

1. Chemical compounds of the general formula:

$$R_FCH=CHX'$$

in which $R_F$ is a polyfluorohydrocarbon group having at least two fluorine atoms on the carbon atom nearest the olefinic bond, and X' is selected from the group consisting of fluorine, cyano, and primary and secondary amine radicals.

2. Chemical compounds of the general formula $$R_FCH=CHX'$$

in which $R_F$ is a perfluorohydrocarbon group and X' is selected from the group consisting of fluorine, cyano and primary and secondary amine radicals.

3. Chemical compounds according to claim 2 in which $R_F$ is a perfluorocycloalkyl group containing not more than about 6 carbon atoms in the ring.

4. Chemical compounds according to claim 2 in which $R_F$ is perfluorophenyl.

5. Chemical compounds according to claim 1 in which $R_F$ is a perfluoroalkyl group containing not more than about 20 carbon atoms.

6. Chemical compounds according to claim 1 in which X' represents an amine radical having the formula:

$$NR_1R_2$$

in which $R_1$ is selected from the group consisting of hydrogen, a hydrocarbon radical, and a halogenohydrocarbon radical, and $R_2$ is selected from the group consisting of a hydrocarbon radical and a halogenohydrocarbon radical.

7. Chemical compounds according to claim 6 in which the hydrocarbon groups in the amine radical are selected from the group consisting of alkyl having not more than about 20 carbon atoms, cycloalkyl having not more than about 6 carbon atoms in the ring, phenyl, benzyl, tolyl and xylyl, and the halogenohydrocarbon groups are selected from the group consisting of halogenoalkyl having not more than about 20 carbon atoms, halogenocycloalkyl having not more than about 6 carbon atoms in the ring, halogenophenyl, halogenobenzyl, halogenotolyl and halogenoxylyl groups.

8. Compounds having the structure $$R_FCH=CHF$$

in which $R_F$ is selected from the group consisting of perfluoroalkyl having not more than about 20 carbon atoms, perfluorocycloalkyl having not more than about 6 carbon atoms in the ring, and perfluorophenyl.

9. Compounds having the structure $$R_FCH=CHCN$$

in which $R_F$ is selected from the group consisting of perfluoroalkyl having not more than about 20 carbon atoms, perfluorocycloalkyl having not more than about 6 carbon atoms in the ring, and perfluorophenyl.

10. Compounds having the structure $$R_FCH=C\overset{H}{\underset{}{-}}N\diagup^{H}_{\diagdown R_1}$$

in which $R_F$ is selected from the group consisting of perfluoroalkyl having not more than about 20 carbon atoms, perfluorocycloalkyl having not more than about 6 carbon atoms in the ring, and perfluorophenyl, and $R_1$ is selected from the group consisting of alkyl having not more than about 6 carbon atoms, phenyl, benzyl, tolyl, xylyl, halogenoalkyl having not more than about 20 carbon atoms, halogenocycloalkyl having not more than about 6 carbon atoms in the ring, halogenophenyl, halogenobenzyl, halogenotolyl and halogenoxylyl.

11. Compounds having the structure $$R_FCH=C\overset{H}{\underset{}{-}}N\diagup^{R_1}_{\diagdown R_2}$$

in which $R_F$ is selected from the group consisting of perfluoroalkyl having not more than about 20 carbon atoms, perfluorocycloalkyl having not more than about 6 carbon atoms in the ring, and perfluorophenyl, and $R_1$ and $R_2$ are selected from the group consisting of alkyl having not more than about 20 carbon atoms, cycloalkyl having not more than about 6 carbon atoms in the ring, phenyl, benzyl, tolyl, xylyl, halogenoalkyl having not more than about 20 carbon atoms, halogenocycloalkyl having not more than about 6 carbon atoms in the ring, halogenophenyl, halogenobenzyl, halogenotolyl and halogenoxylyl.

12. A compound having the structure $$R_FCH=CHF$$

in which $R_F$ is a perfluoroalkyl group having not more than about 20 carbon atoms.

13. A compound having the structure $$R_FCH=CHCN$$

in which $R_F$ is a perfluoroalkyl group having not more than about 20 carbon atoms.

14. A method of making a compound having the structure $$R_FCH=CHX'$$

in which $R_F$ is a polyfluorohydrocarbon group having at least 2 fluorine atoms on the carbon atom nearest the olefinic bond and X' is selected from the group consisting of fluorine, cyano, and primary and secondary amine radicals, which comprises effecting an addition reaction between a polyfluorohydrocarbon-substituted acetylene of the general formula:

$$R_FC\equiv CH$$

in which $R_F$ is as defined above, and a compound of the general formula:

$$HX'$$

in which X' is as defined above.

15. A method according to claim 14 in which HX' is hydrogen cyanide and the addition reaction is performed in the presence of a copper salt as a catalyst.

16. A method according to claim 14 in which HX' is a primary amine and the addition reaction is performed in the presence of a copper salt as a catalyst.

17. A method according to claim 14 in which HX' is a secondary amine and the addition reaction is performed in the presence of a copper salt as a catalyst.

18. A method according to claim 14 in which HX' is hydrogen fluoride and the addition reaction is performed in the presence of boron trifluoride as a catalyst.

19. A method of making a compound having the structure $$R_FCH=CHX'$$

in which $R_F$ is a perfluorohydrocarbon group and X' is selected from the group consisting of fluorine, cyano, and primary and secondary amine radicals, which comprises effecting an addition reaction between a polyfluorohydrocarbon-substituted acetylene of the general formula:

$$R_FC\equiv CH$$

in which $R_F$ is as defined above, and a compound of the general formula:

$$HX'$$

in which X' is as defined above.

20. A method of making a compound having the structure $$R_FCH=CHX'$$

in which $R_F$ is a perfluoroalkyl group having not more than about 20 carbon atoms, and X' is selected from the group consisting of fluorine, cyano, and primary and secondary amine radicals, which comprises effecting an addition reaction between a polyfluorohydrocarbon-substituted acetylene of the general formula:

$$R_FC\equiv CH$$

in which $R_F$ is as defined above, and a compound of the general formula:

$$HX'$$

in which X' is as defined above.

21. A method of making a compound having the structure $$R_FCH=CHX'$$

in which $R_F$ is a perfluorocycloalkyl group having not more than about 6 carbon atoms in the ring, and $X'$ is selected from the group consisting of fluorine, cyano, and primary and secondary amine radicals, which comprises effecting an addition reaction between a polyfluorohydrocarbon-substituted acetylene of the general formula:

$$R_FC\equiv CH$$

in which $R_F$ is as defined above, and a compound of the general formula:

$$HX'$$

in which $X'$ is as defined above.

22. A method of making a compound having the structure $$R_FCH=CHX'$$

in which $R_F$ is a perfluorophenyl radical and $X'$ is selected from the group consisting of fluorine, cyano, and primary and secondary amine radicals, which comprises effecting an addition reaction between a polyfluorohydrocarbon-substituted acetylene of the general formula:

$$R_FC\equiv CH$$

in which $R_F$ is as defined above, and a compound of the general formula:

$$HX'$$

in which $X'$ is as defined above.

23. A method of making a compound having the structure $$R_FCH=CHX'$$

in which $R_F$ is a perfluorohydrocarbon group and $X'$ represents an amine radical having a formula:

$$NR_1R_2$$

in which $R_1$ is selected from the group consisting of hydrogen, a hydrocarbon group, and a halogenohydrocarbon group, and $R_2$ is selected from the group consisting of a hydrocarbon and a halogenohydrocarbon group, which comprises effecting an addition reaction between a polyfluorohydrocarbon-substituted acetylene of the general formula:

$$R_FC\equiv CH$$

in which $R_F$ is as defined above and a compound of the general formula:

$$HX'$$

in which $X'$ is as defined above.

24. A method of making a compound having the structure $$R_FCH=CHX'$$

in which $R_F$ is a perfluorohydrocarbon group and $X'$ represents an amine radical having the formula:

$$NR_1R_2$$

in which $R_1$ and $R_2$ are selected from the group consisting of alkyl having not more than about 20 carbon atoms, cycloalkyl having not more than about 6 carbon atoms in the ring, phenyl, benzyl, tolyl and xylyl radicals, halogenoalkyl having not more than about 20 carbon atoms, halogenocycloalkyl having not more than about 6 carbon atoms in the ring, halogenophenyl, halogenobenzyl, halogenotolyl, halogenoxylyl and hydrogen, not more than one of $R_1$ and $R_2$ being hydrogen, which comprises effecting an addition reaction between a polyfluorohydrocarbon-substituted acetylene of the general formula:

$$R_FC\equiv CH$$

in which $R_F$ is as defined above and a compound of the general formula:

$$HX'$$

in which $X'$ is as defined above.

References Cited in the file of this patent

UNITED STATES PATENTS

| | | |
|---|---|---|
| 2,356,075 | Migrdichian | Aug. 15, 1944 |
| 2,409,124 | Heuser | Oct. 8, 1946 |
| 2,446,124 | Boyd | July 27, 1948 |
| 2,472,812 | Dickey | June 14, 1949 |
| 2,506,068 | Crawford et al. | May 2, 1950 |
| 2,554,219 | Simons et al. | May 22, 1951 |
| 2,560,838 | Arnold | July 17, 1951 |
| 2,704,769 | La Zerte | Mar. 22, 1955 |

OTHER REFERENCES

Auerbach et al.: J. A. C. S., vol. 72, pp. 299–300 (1950).

Haszeldine: J. C. S. (London), 1951, pp. 2495–504.

Haszeldine: "Nature", vol. 168 (Dec. 15, 1951), pp. 1028–31.

Haszeldine: Jour. Chem. Soc. (London), July 1952, pp. 2504–13.

Haszeldine, Jour. Chem. Soc. (London), September 1952, pp. 3490–98.

Henne et al.: J. A. C. S., vol. 76, pp. 479–81 (1954), received date July 29, 1953.